United States Patent [19]
Mandelcorn et al.

[11] Patent Number: 6,081,435
[45] Date of Patent: *Jun. 27, 2000

[54] CROSS-CONDUCTION LIMITING CIRCUIT, METHOD OF OPERATION THEREOF AND DC/DC CONVERTER EMPLOYING THE SAME

[75] Inventors: Yehoshua Mandelcorn, Dallas; Hengchun Mao, Plano, both of Tex.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 09/072,389

[22] Filed: May 4, 1998

[51] Int. Cl.$^7$ .......................... H02H 7/122; H02M 3/335
[52] U.S. Cl. ............................ 363/56; 363/17; 363/58
[58] Field of Search .................. 363/17, 56, 98, 363/132, 24, 25, 95, 97, 124, 131, 133, 134

[56] References Cited

U.S. PATENT DOCUMENTS

| | | | |
|---|---|---|---|
| 4,233,658 | 11/1980 | Lupatin et al. | 323/97 X |
| 4,866,586 | 9/1989 | Suko | 363/17 |
| 5,245,520 | 9/1993 | Imbertson | 363/98 X |

*Primary Examiner*—Jessica Han

[57] ABSTRACT

For use in a power converter including first and second controllable switches coupled in series across an input, the switches are also coupled to a power transformer, a cross-conduction limiting circuit for, and method of, limiting cross-conduction currents between the first and second controllable switches. In one embodiment, the cross-conduction limiting circuit includes an inductive element, coupled between the first and second controllable switches, that limits a flow of cross-conduction currents between the first and second controllable switches when the first and second controllable switches are simultaneously conducting.

35 Claims, 6 Drawing Sheets

CROSS-CONDUCTION LIMITING CIRCUIT, METHOD OF OPERATION THEREOF AND DC/DC CONVERTER EMPLOYING THE SAME

TECHNICAL FIELD OF THE INVENTION

The present invention is directed, in general, to power conversion and, more specifically, to a cross-conduction limiting circuit for switches in a power converter, a method of operating such circuit and a DC/DC converter employing the circuit or the method.

BACKGROUND OF THE INVENTION

Regulated DC power supplies are typically needed for most analog and digital electronic systems. Two major categories of regulated DC power supplies are linear power supplies and switching power supplies. Generally, in linear power supplies, to provide electrical isolation between an input and an output and to provide the output in a desired voltage range, a transistor (operating in its active region) is connected in series with a transformer, e.g., a 60 Hz transformer.

In switching power supplies, transformation of DC voltage from one level to another is accomplished typically with DC/DC converter circuits, such as a step-down (buck) or step-up (boost) circuit. Solid-state devices, such as transistors, are operated as switches (either completely ON or completely OFF) within these switching converters. Since the power devices are not required to operate in their active region, this mode of operation results in lower power dissipation. Furthermore, increasing switching speeds, higher voltage and current ratings of these power devices are some of the factors that have increased the popularity of switching power supplies.

Two dominant topologies within an isolated medium-power category of switching power supplies are the half-bridge and the two-switch forward converter topologies. Both the half-bridge and the two-switch forward converters employ two switching devices that are used to impress a voltage waveform across the primary winding of an isolation transformer. The half-bridge converter topology offers excellent utilization of the transformer core and windings, since the flux swings symmetrically in both directions and current flows through the windings for most of each cycle. If, however, both switches are ON simultaneously, even for a fraction of a microsecond, large cross-conduction currents may result. These large cross-conduction currents, may in turn, severely stress and possibly destroy the controllable switches. To prevent these destructive cross-conduction currents, half-bridge converters typically limit the duty cycles of the controllable switches to insure sufficient "dead time" between each switch being ON. This forces peak currents and the size of the major power train components to increase. Alternatively, high speed detection of turn-off of one switch before allowing the opposite polarity switch to turn-on, is employed. This scheme, however, adds cost and complexity to the half-bridge regulation and gate drive circuitry. Even with these measures, the cross-conduction problem is difficult to completely mitigate due to circuit noise.

The forward converter, on the other hand, is inherently protected against cross-conduction, since the two controllable switches are designed to be turned ON simultaneously. The forward converter, however, is single-ended and, as a result, the transformer core flux excursions are only in one direction from zero. Consequently, only half of the transformer core's flux excursion capabilities are utilized. Furthermore, since current flows through the windings less than half of the time, the windings are also not efficiently utilized. Both of the above-described shortcomings contribute to requiring a substantially larger transformer and higher peak currents for a given power output than what would be typically employed in a half-bridge converter.

Accordingly, what is needed in the art is an improved half-bridge converter that mitigates the above-described problems. More specifically, what is needed in the art is a converter topology that has the efficient transformer utilization of the half-bridge converter with the robustness of the forward converter.

SUMMARY OF THE INVENTION

To address the above-discussed deficiencies of the prior art, the present invention provides, for use in a power converter including first and second controllable switches coupled in series across an input voltage, the switches also coupled to a power transformer, a cross-conduction limiting circuit for, and method of, limiting cross-conduction currents between the first and second controllable switches. In one embodiment, the cross-conduction limiting circuit includes an inductive element, coupled between the first and second controllable switches, that limits a flow of cross-conduction currents between the first and second controllable switches when the first and second controllable switches are simultaneously conducting.

The present invention therefore discloses a novel circuit that limits the formation of cross-conduction currents when the controllable switches are simultaneously conducting, by introducing inductances between the controllable switches. In one embodiment, split primary windings on a power transformer are employed wherein the leakage inductance between the split primary windings limits the current surges that may flow through the controllable switches if they are briefly turned ON simultaneously. In another embodiment, two, typically, small inductors (chokes) are employed between the controllable switches.

In one embodiment of the present invention, the first and second controllable switches are selected from a group that includes: (1) metal-oxide-semiconductor field effect transistors (MOSFETs), (2) bipolar junction transistors (BJTs), (3) insulated gate bipolar transistors (IGBTs) and (4) gate turn-off thyristors (GTOs).

In one embodiment of the present invention, the power transformer includes a split primary winding. The split primary winding, in turn, introduces leakage inductances between the switches. Those skilled in the art should readily appreciate that the leakage inductances of the split primary winding may also be augmented by external inductors.

In one embodiment of the present invention, the inductive element includes first and second inductors coupled between said first and second controllable switches. The present invention is not limited to a particular number of inductors, alternatively, a single inductor may be also employed between the switches to provide protection against simultaneous conduction of the switches.

In one embodiment of the present invention, the first and second controllable switches are operated in a symmetric alternating mode. Alternatively, the first and second controllable switches may also be operated in an asymmetric mode. The half-bridge converter of present invention is not limited to any one particular mode of operation.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the concepts and the specific embodiments disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
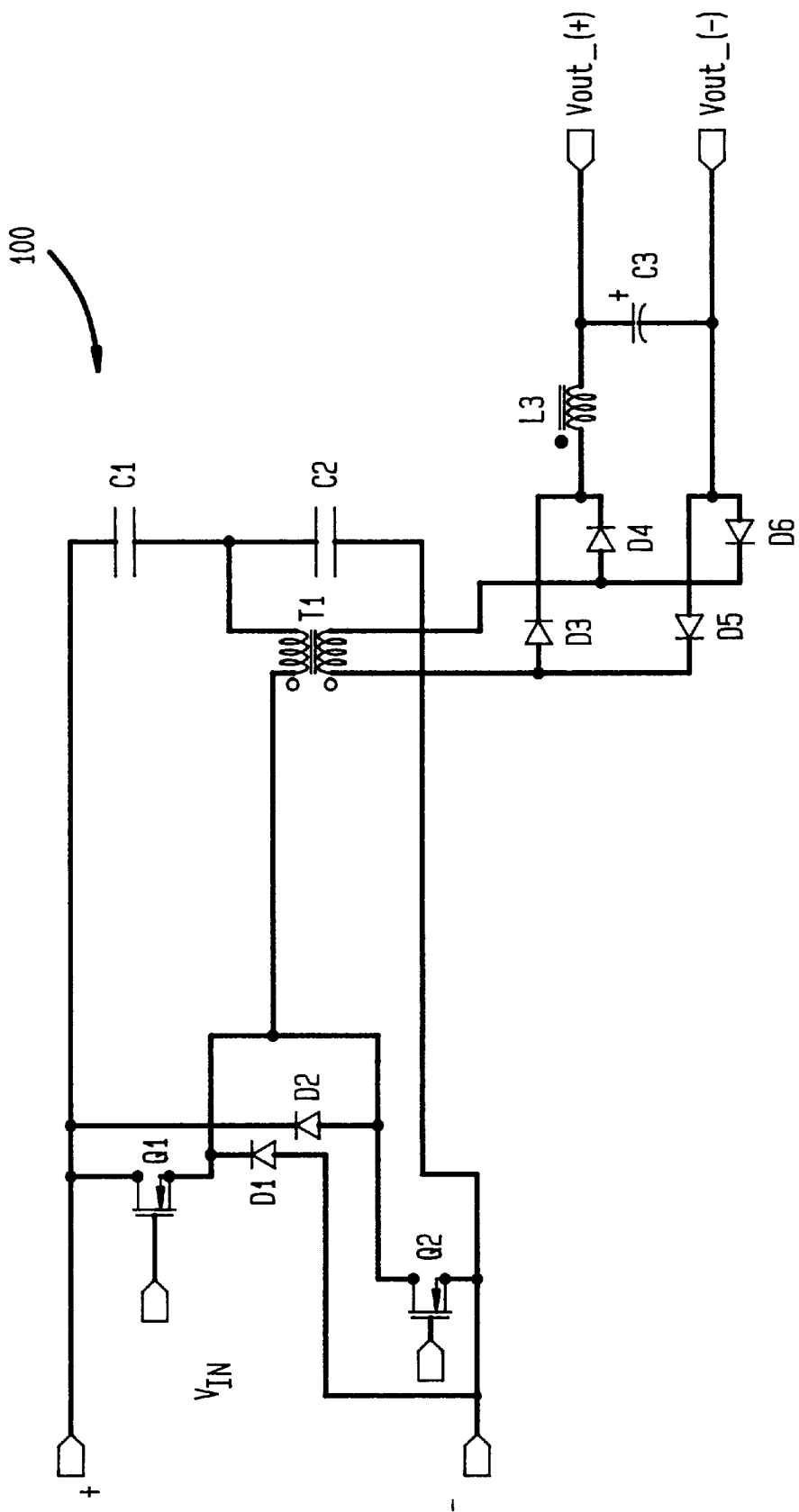
FIG. 1 illustrates a schematic diagram of a prior art half-bridge DC/DC converter.
Figure 2:
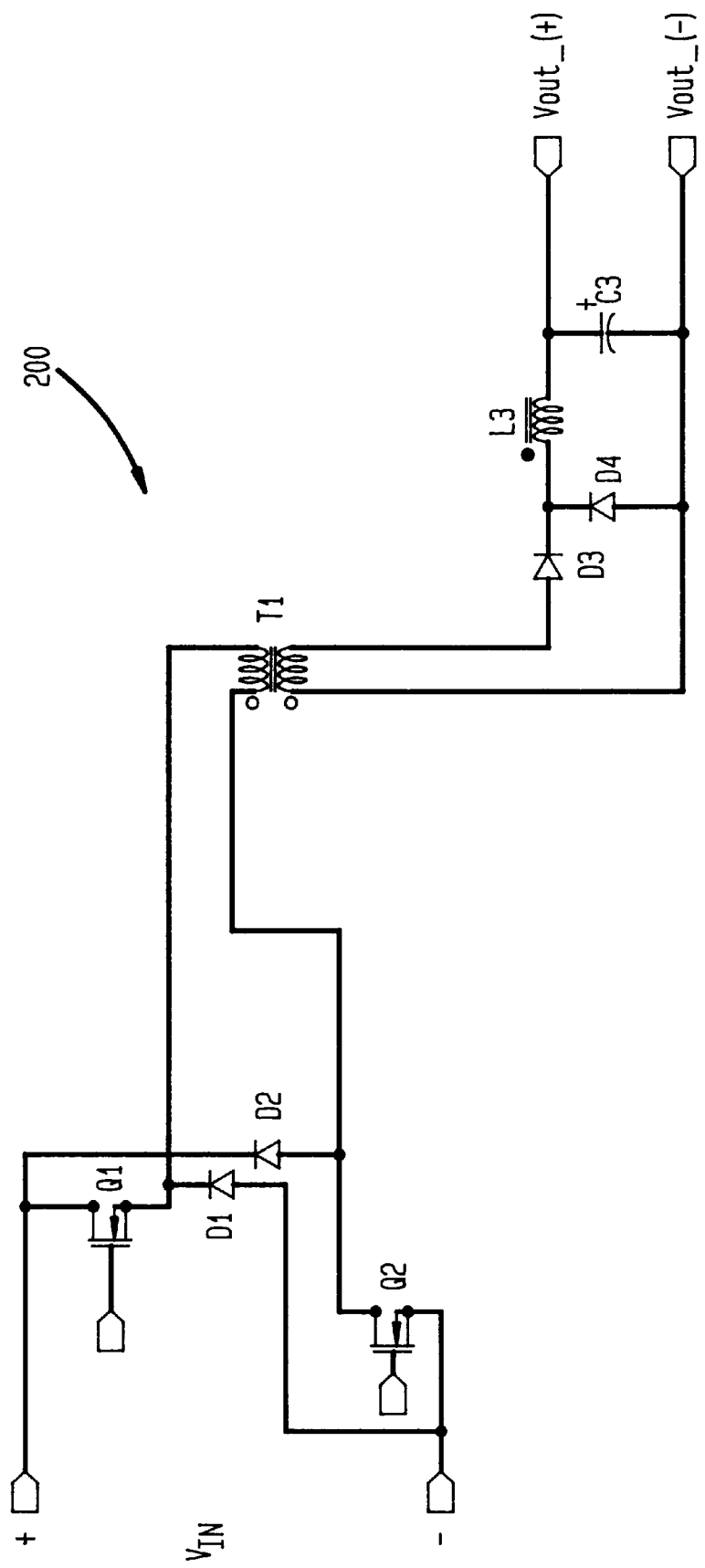
FIG. 2 illustrates a schematic diagram of a prior art two-transistor forward DC/DC converter.

Referring initially to FIGS. 1 and 2, illustrated are conventional half-bridge and forward DC/DC converter topologies. More specifically, FIG. 1 illustrates a schematic diagram of a prior art half-bridge DC/DC converter 100 and FIG. 2 illustrates a schematic diagram of a prior art two-transistor forward DC/DC converter 200.

In the half-bridge converter 100, a pair of capacitors C1, C2 are connected in series across the DC input Vin with their junction at a midpotential value. The capacitors C1, C2 establish a voltage at a midpoint between zero and the input DC voltage and should be of sufficiently large capacitive values to ensure that the potential at their junction remains essentially constant with respect to a negative input terminal DC_BUS(−). First and second controllable switches Q1, Q2 are alternately turned ON, i.e., conducting. The current through the primary winding of a power transformer T1 is "split" between the capacitors C1, C2. First and second clamp diodes D1, D2 are coupled in series with the first and second controllable switches Q1, Q2, respectively, across the input Vin. In an advantageous embodiment, the first and second clamp diodes D1, D2 are the body diodes of the first and second controllable switches Q1, Q2. The first and second clamp diodes D1, D2 provide paths for the current required due to leakage and magnetizing flux of the transformer T1 when their respective switches are turned OFF. It should be noted that the first and second controllable switches Q1, Q2 cannot be turned ON simultaneously.

The two-transistor forward DC/DC converter's 200 primary side circuit of two controllable switches with their respective clamp diodes is similar to the half-bridge converter 100, except that the capacitors C1, C2 used in the half-bridge converter 100 are not present and the controllable switches are connected to opposite ends of the transformer primary. The converter's 200 two switches can be turned ON simultaneously. When the switches are OFF, magnetizing current flows back into an input supply Vin through the clamp diodes, eliminating the need for a separate demagnetizing winding or snubbers.

As described previously, the half-bridge converter 100 offers excellent utilization of the transformer core and windings since the flux swings symmetrically in both directions and current flows through the windings for most of each cycle. If, however, both switches are ON simultaneously (e.g., if the switching devices employed have turn-off delays), even for a fraction of a microsecond, large destructive cross-conduction currents may result. These large cross-conduction currents, may in turn, severely stress and possibly destroy the controllable switches. To prevent these destructive cross-conduction currents, the half-bridge converters employ duty cycle restrictions or elaborate control and gate drive circuitry, which increase the cost and/or complexity of the converters.

The forward converter 200, on the other hand, is inherently protected against cross-conduction, since there are only two controllable switches that are designed to be turned ON simultaneously. The forward converter, however, is single ended and as a result, the transformer core flux excursions are only in one direction from zero. Consequently, only half of the transformer core's flux excursion capabilities is utilized. Furthermore, since current flows through the windings less than half of the time, the windings are also not efficiently utilized. Both of the above-described shortcomings contribute to requiring a substantially larger transformer for a given power output than what would be typically employed in a half-bridge converter.

The present invention discloses a novel circuit that limits the formation of cross-conduction currents when the controllable switches are simultaneously conducting, by introducing inductances between the controllable switches. In one embodiment, split primary windings on a power transformer are employed wherein the leakage inductance between the split primary windings limits the current surges that may flow through the controllable switches if they are briefly turned ON simultaneously. In another embodiment, two small inductors (chokes) are employed between the controllable switches. The use of split primary windings and chokes may be explained in greater detail by referring to FIGS. 3 and 4.

Figure 3:
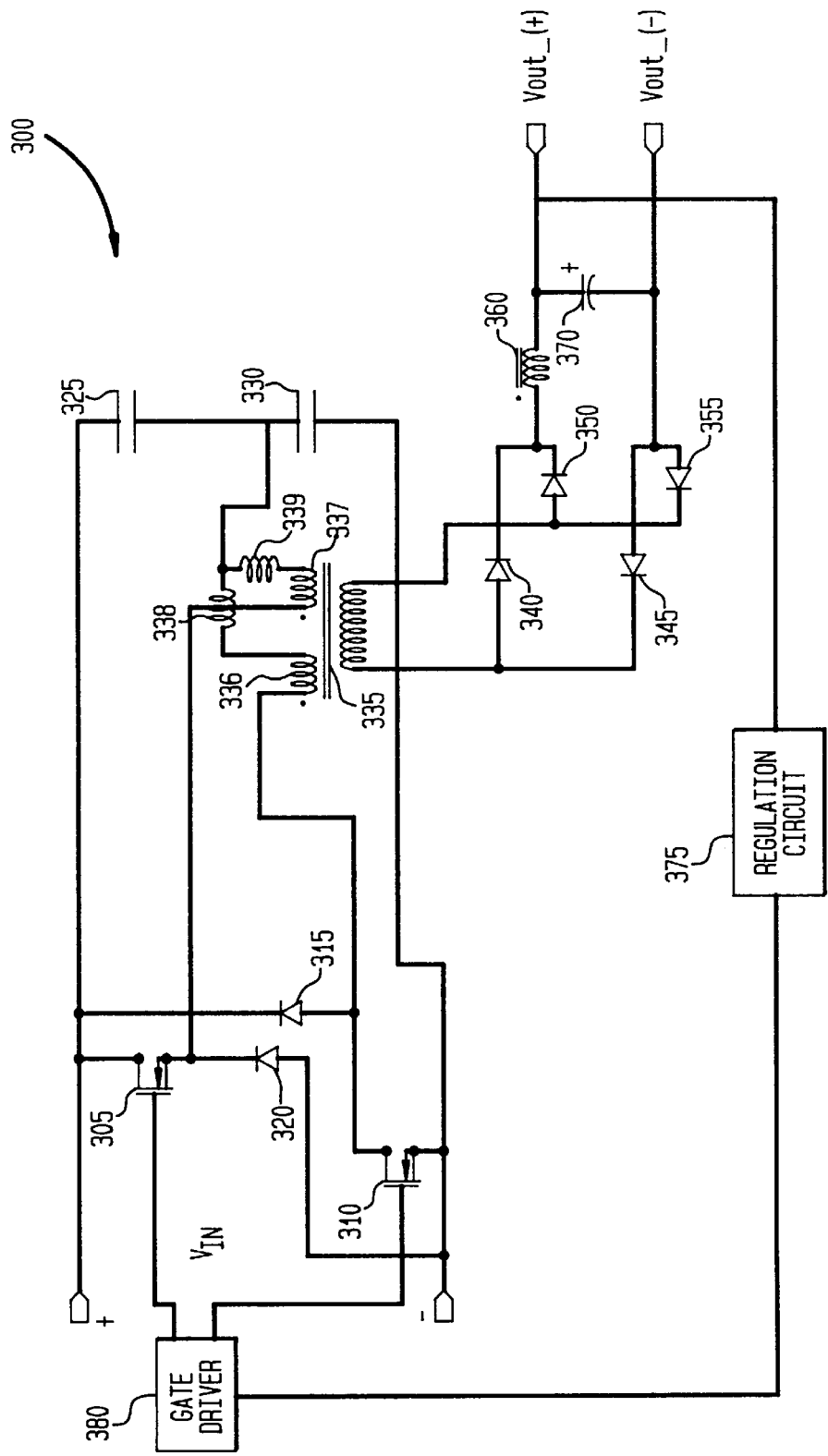
FIG. 3 illustrates a schematic diagram of an embodiment of a half-bridge converter with a split primary constructed according to the principles disclosed by the present invention.

Turning now to FIG. 3, illustrated is a schematic diagram of an embodiment of a half-bridge converter 300 with a split primary constructed according to the principles disclosed by the present invention. The converter 300 includes first and second controllable switches 305, 310 that are coupled to first and second primary windings 337, 336, respectively, of a power transformer 335. Although metal-oxide-semiconductor field effect transistors (MOSFETs) are shown in the illustrated embodiment, in other advantageous embodiments the controllable switches may be any switching device including bipolar junction transistors (BJTs), insulated gate bipolar transistors (IGBTs) and gate turn-off thyristors (GTOs). It should be readily apparent to those skilled in the art that other controllable switches that are not listed above may also be advantageously employed in the practice of the present invention. First and second clamp diodes 320, 315 are coupled in series with the first and second controllable switches 305, 310, respectively, and with their respective switches across an input Vin. The first and second clamp diodes 320, 315 provide paths for the current required due to the leakage and magnetizing flux of the power transformer 335 when their respective switches are turned OFF. Also shown coupled to the power transformer 335 and the first and second controllable switches 305, 310 are first and second capacitors 325, 330. The first and second capacitors 325, 330 provide a flow path for the power transformer 335 primary current and balancing of the magnetic flux in the power transformer 335. A rectifying circuit that includes first, second, third and fourth rectifying diodes 340, 345, 350, 355 rectifies the waveform supplied by the secondary winding of the power transformer 335. A filter including an output inductor 360 and an output capacitor 370 acts upon the rectified waveform to supply an output voltage Vout. A regulation circuit 375, such as a pulse-width-modulation (PWM) controller, senses the output voltage Vout and controls the switching of the first and second controllable switches 305, 310 using a gate driver 380. The construction and operation of regulation circuits and gate drivers are well known in the art and will hereinafter not be described in detail.

The first and second controllable switches 305, 310 may be controlled either in a complementary (asymmetric) mode, similar to the switching scheme use in a conventional asymmetrical half-bridge converter, or in a symmetric alternating mode that is similar to a conventional PWM push-pull converter. Using a symmetric alternating mode for the controllable switches, however, results in lower voltage stresses on the first, second, third and fourth rectifying diodes 340, 345, 350, 355 and lower current ripple in the output inductor 360.

The operation of the half-bridge converter 300 will be described primarily in the symmetric alternating mode. It should be noted, however, that the principles disclosed by the present invention may also be easily extended to half-bridge converters operating in asymmetric mode. With the first and second switches 305, 310 controlled symmetrically, i.e., duty cycles are equal, the voltages across the first and second capacitors 325, 330 are each equal to half the input voltage, i.e., Vin/2. When the first controllable switch is turned ON, the voltage across the second primary winding 337 will also be substantially equal to Vin/2. When the second controllable switch 310 is turned ON, the voltage across the first primary winding 336 is substantially equal to −Vin/2. No voltages are applied to the first and second primary windings 336, 337 when both the first and second controllable switches 305, 310 are OFF, i.e., not conducting. During the period when either controllable switch is ON, the power transformer 335 transfers energy to its secondary winding, which in turn, steps up or down the voltage (depending on the turns ratio of the transformer). The first, second, third and fourth rectifying diodes 340, 345, 350, 355 rectify the power transformer's 335 secondary voltage and the output inductor 360 averages the rectified voltage prior to delivering the output voltage Vout. The output voltage Vout may be controlled by controlling the duty cycles of the first and second controllable switches 305, 310.

Employing two primary windings, i.e., first and second primary windings 336, 337, in the power transformer 335 introduces leakage inductances (illustrated as first and second leakage inductances 338, 339) between the primary windings. It should be noted that the first and second leakage inductances 338, 339 are not separate physical components from the power transformer 335 but are intrinsic elements of the power transformer 335. The first and second leakage inductances 338, 339, i.e., effective leakage inductive elements, are also in the current path between the first and second controllable switches 305, 310 which limit the current surges that will flow through the first and second controllable switches 305, 310 if they are both briefly turned ON simultaneously. Limiting the cross-conductance between the first and second controllable switches 305, 310 avoids the "shoot-through" damage that may result from destructive large cross-conductance currents. It should be readily apparent to those skilled in the art that the leakage inductances may also be augmented by external (to the transformer) inductances.

Figure 4:
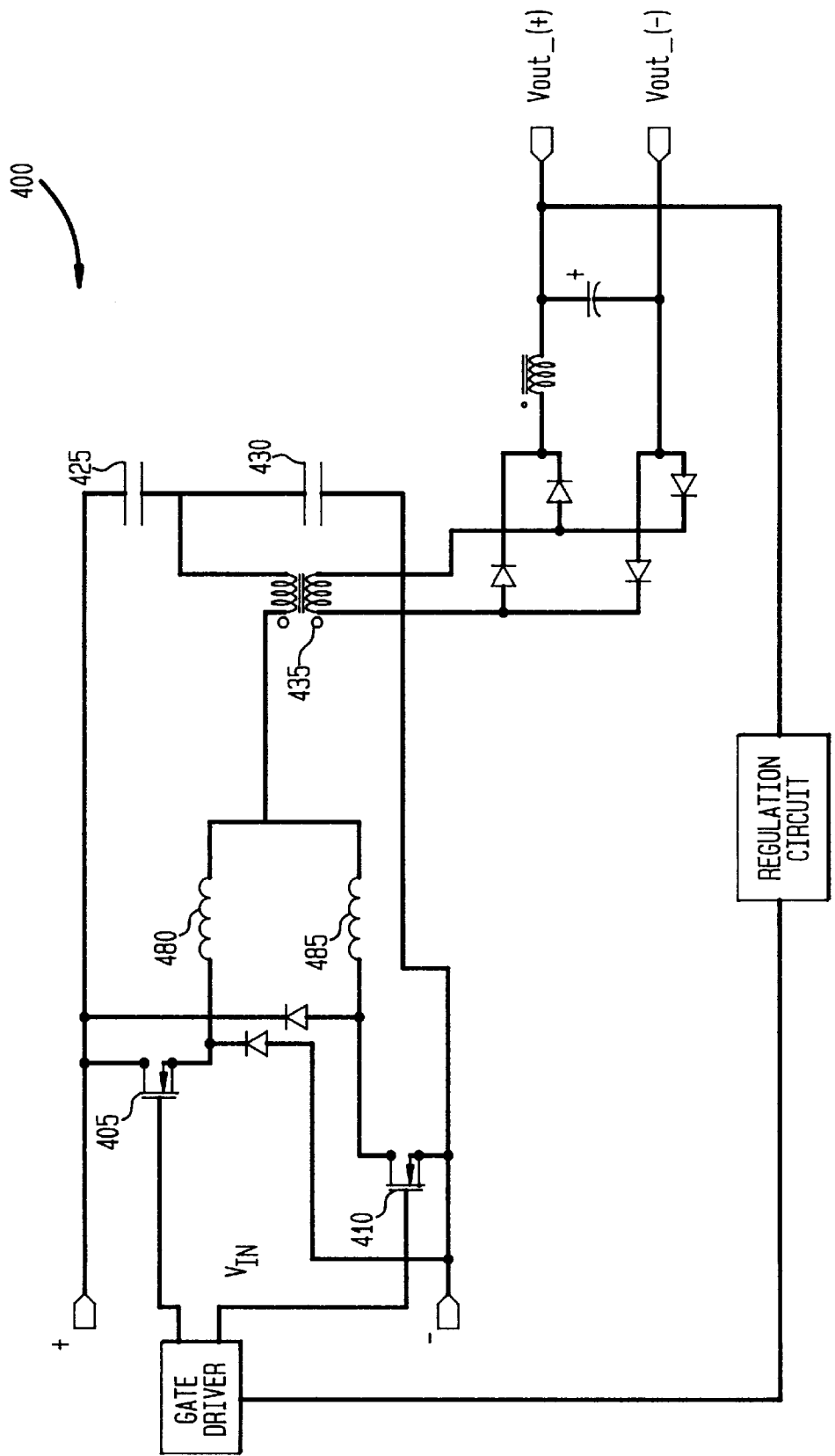
FIG. 4 illustrates a schematic diagram of an embodiment of a half-bridge converter utilizing chokes and constructed according to the principles disclosed by the present invention.

Turning now to FIG. 4, illustrated is a schematic diagram of an embodiment of a half-bridge converter 400 using inductors and constructed according to the principles disclosed by the present invention. The converter's 400 circuit configuration is similar to that of the converter 300 of FIG. 3. Unlike the converter 300, which employs a split primary to introduce inductances between the controllable switches, the converter 400 employs a single primary transformer 435 and places inductive elements (chokes), i.e., first and second inductors 480, 485, between first and second controllable switches 405, 410. The first and second inductors 480, 485 limit the current surges that may flow through the first and second controllable switches 405, 410 if they are briefly turned ON simultaneously. Additionally, the first and second inductors 480, 485 also serve to slow down the charging of the power transformer's winding capacitance when either the first or second controllable switches 405, 410 are turned ON, helping to reduce high frequency electromagnetic interference (EMI). Although two inductors are shown in the illustrated embodiment, it should be apparent to those skilled in the art that a single inductor, either the first or second inductor 480, 485, may also be advantageously employed to achieve a limitation of shoot-through current. If, however, a single inductor is used, a slight asymmetry will be introduced into the output. Also, the EMI benefits described above will not be realized when the switch without a choke in series is turned ON.

Although the practice of the present invention has been described above in half-bridge converters (two switches), the principles disclosed by the present invention may also be advantageously practiced in other converter topologies with multiple switches, such as full-bridge converters. The practice of the present invention may be illustrated further by referring to FIGS. 5 and 6.

Figure 5:
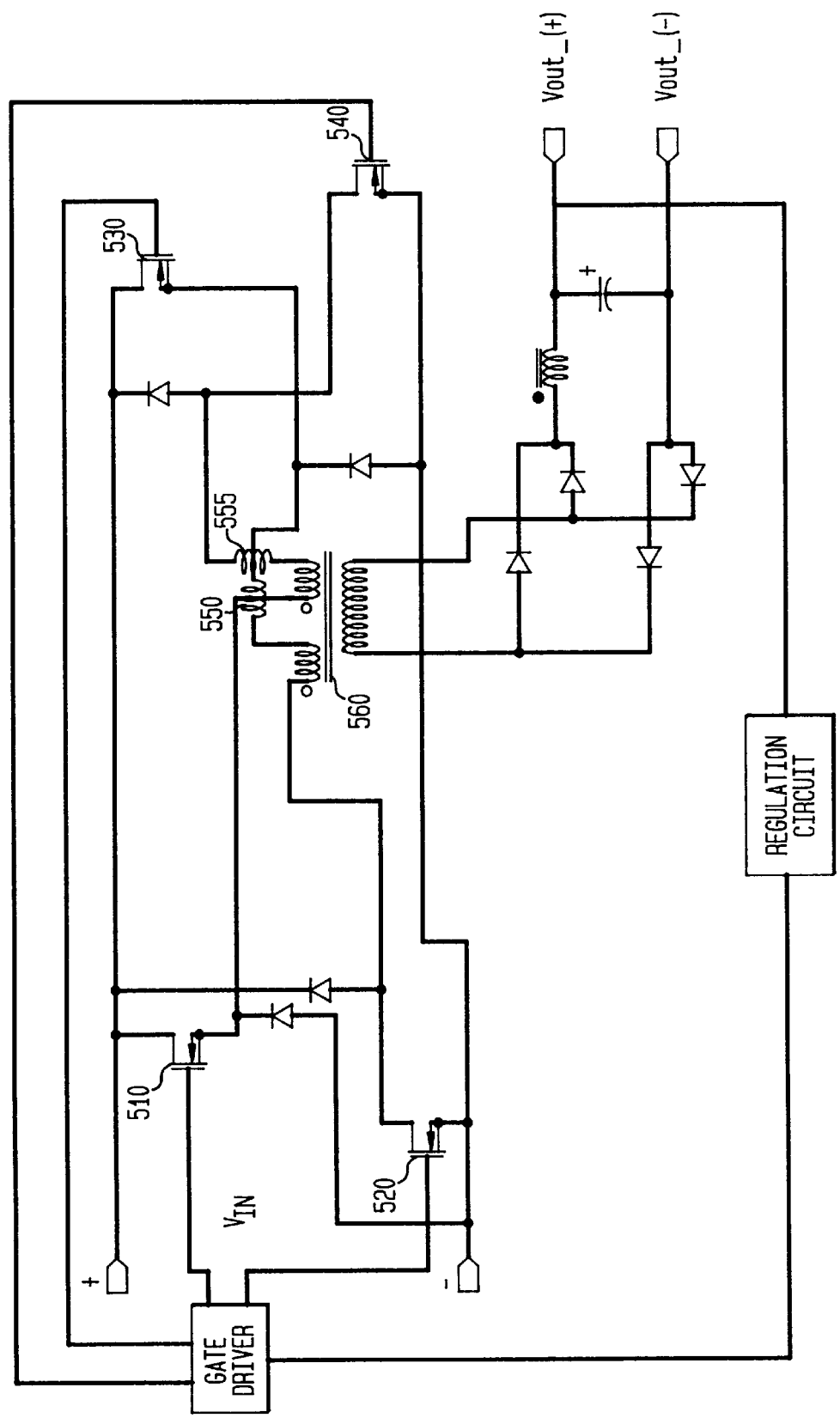
FIG. 5 illustrates a schematic diagram of an embodiment of a full-bridge converter with a split primary according to the principles disclosed by the present invention.

Turning now to FIG. 5, illustrated is a schematic diagram of an embodiment of a full-bridge converter 500 with a split primary according to the principles disclosed by the present invention. The converter 500 is analogous to the converter 300, illustrated in FIG. 3, except that the first and second capacitors 325, 330 are replaced by two additional controllable switches. The converter's 500 controllable switches, i.e., first, second, third and fourth switches 510, 520, 530, 540, are coupled to a power transformer 560 with a split primary winding. First and second leakage inductances 550, 555 of the power transformer 560 are also shown coupled between the first, second, third and fourth switches 510, 520, 530, 540. As before, it should be noted that the first and second leakage inductances 550, 555 are intrinsic to the power converter 560 and may also be augmented by external inductors. In the converter 500, switches of opposite "legs," i.e., first and fourth controllable switches 510, 540 or second and third controllable switches 520, 530, are turned ON simultaneously to apply a full input voltage Vin to the power transformer's 560 primary winding. For example, the first and fourth controllable switches 510, 540 are turned ON to apply the input voltage Vin to one polarity of the power transformer 560 and the second and third controllable switches 520, 530 are turned ON (complementary to the first and fourth controllable switches 510, 540) to apply the opposite polarity. Since the first and second controllable switches 510, 520 are coupled to separate windings, the leakage inductances provide the shoot-through current protection from simultaneous conduction of the first and second controllable switches 510, 520. Similarly, the third and fourth controllable switches 530, 540 are also protected from damage as a result of simultaneous conduction.

Figure 6:
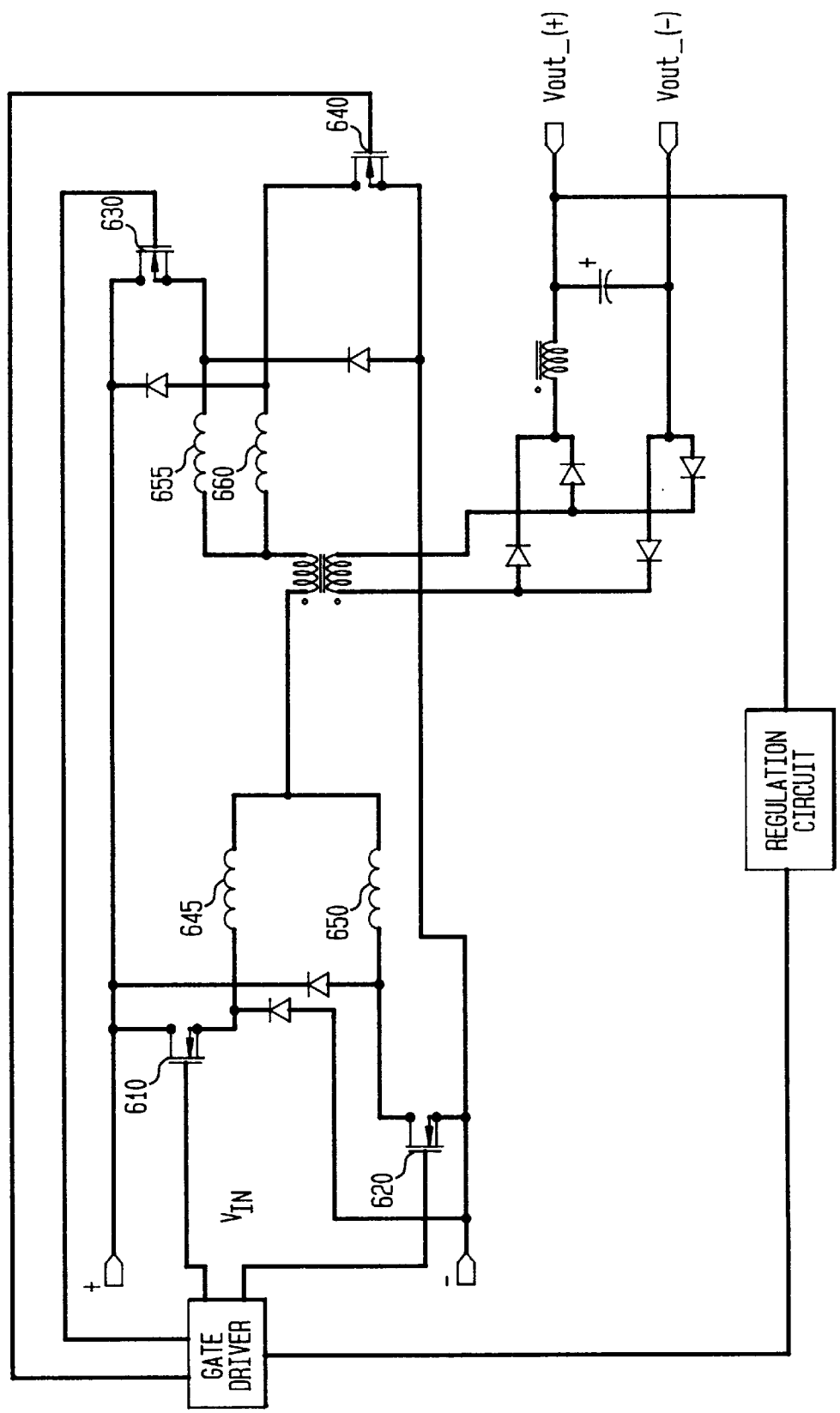
FIG. 6 illustrates a schematic diagram of a full-bridge converter using the principles disclosed by the present invention.

Turning now to FIG. 6, illustrated is a schematic diagram of a full-bridge converter 600 using the principles disclosed by the present invention. The converter 600 is analogous to the converter 400, illustrated in FIG. 4, except that first and second capacitors 425, 430 are replaced by two additional controllable switches. Protection from simultaneous conduction of first and second controllable switches 610, 620 is provided by first and second inductors 645, 650 that are coupled between the first and second controllable switches 610, 620. Likewise, third and fourth controllable switches 630, 640 are also protected from simultaneous conduction by third and fourth inductors 655, 660 that are coupled between the switches. As noted previously, either pair of inductors, i.e., first and second inductors 645, 650 or third and fourth inductors 655, 660, may also be substituted with a single inductor and still realize the shoot-through current protection.

It should be emphasized again that although the operation of converter 300 of FIG. 3 had been described with respect to a symmetric alternating mode, the principles disclosed by the present invention may also be advantageously practiced in converters operating in an asymmetric mode. Furthermore, in all of the converters described above, transformers with a single secondary winding coupled to four rectifying diodes are illustrated. Those skilled in the art should readily appreciate that a transformer with a center tapped secondary may also be employed. With a center-tapped secondary winding, the number of rectifying diodes needed is reduced to two. This scheme is particularly advantageous in low voltage output applications where eliminating a rectifying diode's voltage drop is important.

Although the present invention and its advantages have been described in detail, those skilled in the art should understand that they can make various changes, substitutions and alterations herein without departing from the spirit and scope of the invention in its broadest form.

What is claimed is:

1. For use in a power converter including at least first and second controllable switches coupled in series across an input voltage, said first and second controllable switches also coupled to a power transformer, a cross-conduction limiting circuit comprising:
    an inductive element having only a single winding, coupled between said first and second controllable switches, that limits a flow of cross-conduction currents between said first and second controllable switches when said first and second controllable switches are simultaneously conducting.

2. The cross-conduction limiting circuit as recited in claim 1 wherein said first and second controllable switches are selected from the group consisting of:
    metal-oxide-semiconductor field effect transistors (MOSFETs),
    bipolar junction transistors (BJTs),
    insulated gate bipolar transistors (IGBTs), and
    gate turn-off thyristors (GTOs).

3. The cross-conduction limiting circuit as recited in claim 1 wherein said power transformer includes a split primary winding.

4. The cross-conduction limiting circuit as recited in claim 1 further comprising a second inductive element, having a single winding and coupled between said first and second controllable switches.

5. The cross-conduction limiting circuit as recited in claim 1 wherein said first and second controllable switches are operated in a symmetric alternating mode.

6. The cross-conduction limiting circuit as recited in claim 1 wherein said first and second controllable switches are operated in an asymmetric mode.

7. The cross-conduction limiting circuit as recited in claim 1 wherein said power converter is selected from the group consisting of:
    a half-bridge converter, and
    a full-bridge converter.

8. For use in a power converter including first and second controllable switches coupled in series across an input voltage, said first and second controllable switches also coupled to a power transformer, a method for limiting cross-conduction currents between said first and second controllable switches, comprising:
    causing a current to flow alternately through said first and second controllable switches to said power transformer; and
    limiting a flow of cross-conduction current between said first and second controllable switches with an inductive element having only a single winding, coupled between said first and second controllable switches, when said first and second controllable switches are simultaneously conducting.

9. The method as recited in claim 8 wherein said first and second controllable switches are selected from the group consisting of:
    metal-oxide-semiconductor field effect transistors (MOSFETs),
    bipolar junction transistors (BJTs),
    insulated gate bipolar transistors (IGBTs), and
    gate turn-off thyristors (GTOs).

10. The method as recited in claim 8 wherein said power transformer includes a split primary winding.

11. The method as recited in claim 8 further comprising further limiting a flow of cross-conduction current between said first and second controllable switches with a second inductive element having a single winding, coupled between said first and second controllable switches.

12. The method as recited in claim 8 wherein said first and second controllable switches are operated in a symmetric alternating mode.

13. The method as recited in claim 8 wherein said first and second controllable switches are operated in an asymmetric mode.

14. The method as recited in claim 8 wherein said power converter is selected from the group consisting of:
    a half-bridge converter, and
    a full-bridge converter.

15. A DC/DC converter comprising:
    an input for accepting a DC voltage;
    a power transformer including a primary and secondary winding;
    at least first and second controllable switches for periodically coupling said input to said primary winding;
    a rectifying circuit coupled to said secondary winding that rectifies a periodic waveform across said secondary winding;

an output filter that averages said rectified periodic waveform; and an inductive element having only a single winding, coupled between said first and second controllable switches, that limits a flow of cross-conduction currents between said first and second controllable switches when said first and second controllable switches are simultaneously conducting.

16. The DC/DC converter as recited in claim 15 wherein said primary winding is split.

17. The DC/DC converter as recited in claim 15 further comprising a second inductive element, having a single winding and coupled between said first and second controllable switches.

18. The DC/DC converter as recited in claim 15 wherein said first and second controllable switches are operated in a symmetric alternating mode.

19. The DC/DC converter as recited in claim 15 wherein said first and second controllable switches are operated in an asymmetric mode.

20. For use in a power converter including at least first and second controllable switches coupled in series across an input voltage, said first and second controllable switches also coupled to a power transformer, a cross-conduction limiting circuit comprising:

an inductive element, intrinsic to said power transformer and coupled between said first and second controllable switches, that limits a flow of cross-conduction currents between said first and second controllable switches when said first and second controllable switches are simultaneously conducting.

21. The cross-conduction limiting circuit as recited in claim 20 wherein said first and second controllable switches are selected from the group consisting of:

metal-oxide-semiconductor field effect transistors (MOSFETs), bipolar junction transistors (BJTs), insulated gate bipolar transistors (IGBTs), and gate turn-off thyristors (GTOs).

22. The cross-conduction limiting circuit as recited in claim 20 wherein said power transformer includes a split primary winding.

23. The cross-conduction limiting circuit as recited in claim 20 wherein said first and second controllable switches are operated in a symmetric alternating mode.

24. The cross-conduction limiting circuit as recited in claim 20 wherein said first and second controllable switches are operated in an asymmetric mode.

25. The cross-conduction limiting circuit as recited in claim 20 wherein said power converter is selected from the group consisting of a half-bridge converter, and a full-bridge converter.

26. For use in a power converter including first and second controllable switches coupled in series across an input voltage, said first and second controllable switches also coupled to a power transformer, a method for limiting cross-conduction currents between said first and second controllable switches, comprising the steps of:

causing a current to flow alternately through said first and second controllable switches to said power transformer; and limiting a flow of cross-conduction current between said first and second controllable switches with an inductive element, intrinsic to said power transformer and coupled between said first and second controllable switches, when said first and second controllable switches are simultaneously conducting.

27. The method as recited in claim 26 wherein said first and second controllable switches are selected from the group consisting of:

metal-oxide-semiconductor field effect transistors (MOSFETs), bipolar junction transistors (BJTs), insulated gate bipolar transistors (IGBTs), and gate turn-off thyristors (GTOs).

28. The method as recited in claim 26 wherein said power transformer includes a split primary winding.

29. The method as recited in claim 26 wherein said first and second controllable switches are operated in a symmetric alternating mode.

30. The method as recited in claim 26 wherein said first and second controllable switches are operated in an asymmetric mode.

31. The method as recited in claim 26 wherein said power converter is selected from the group consisting of:

a half-bridge converter, and a full-bridge converter.

32. A DC/DC converter comprising:

an input for accepting a DC voltage;

a power transformer including a primary and secondary winding;

at least first and second controllable switches for periodically coupling said input to said primary winding;

a rectifying circuit coupled to said secondary winding that rectifies a periodic waveform across said secondary winding;

an output filter that averages said rectified periodic waveform; and an inductive element, intrinsic to said power transformer and coupled between said first and second controllable switches, that limits a flow of cross-conduction currents between said first and second controllable switches when said first and second controllable switches are simultaneously conducting.

33. The DC/DC converter as recited in claim 32 wherein said primary winding is split.

34. The DC/DC converter as recited in claim 32 wherein said first and second controllable switches are operated in a symmetric alternating mode.

35. The DC/DC converter as recited in claim 32 wherein said first and second controllable switches are operated in an asymmetric mode.

* * * * *